United States Patent Office 3,413,435
Patented Nov. 26, 1968

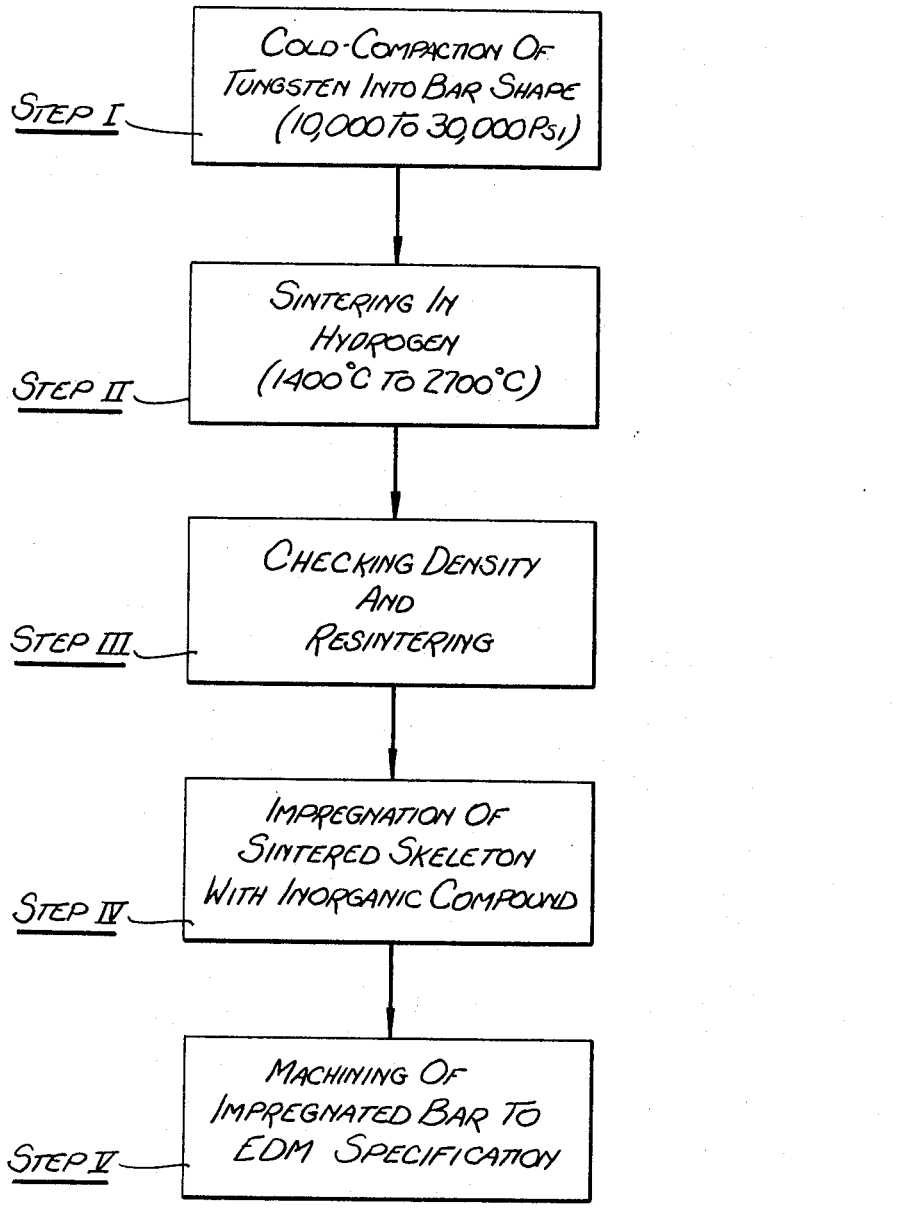
Technique For Fabricating EDM Electrodes

3,413,435
ELECTRICAL DISCHARGE MACHINE ELECTRODES IMPREGNATED WITH INORGANIC COMPOUNDS
John Sam Holtzclaw, Clermont, Fla., assignor to Rametco, Inc., Clermont, Fla.
Filed Oct. 2, 1964, Ser. No. 401,071
5 Claims. (Cl. 219—69)

ABSTRACT OF THE DISCLOSURE

An electrical discharge machining electrode in which a porous skeleton shaped to the desired electrode configuration is formed of a sintered refractory metal such as tungsten, molybdenum, tantalum and columbium, the pores of the skeleton being filled with an inorganic compound, preferably of lower ionization potential, such as barium tungstate.

---

This invention relates generally to electrodes adapted for electrical discharge machining techniques, and more particularly to electrodes having superior wear ratio and machinability characteristics. This invention constitutes an improvement over that disclosed in my now abandoned copending application Ser. No. 376,074 filed June 18, 1964.

The electrical discharge machining technique is commonly referred to as "EDM." It is based on the controlled erosion of a metal arising from a rapidly recurring spark discharge impinging on the surface being machined. The workpiece melts in a small area surrounding the point at which it is struck by the spark, and a portion of the liquefied or vaporized metal is expelled. This is accomplished by submerging the workpiece and the spark electrode or tool in a dielectric fluid which is circulated to flush away the eroded swarf. The electrode and workpiece separation is maintained by a servomechanism.

The EDM technique is especially useful in fabricating difficult-to-machine parts and in the formation of odd-shaped holes, die cavities and other intricate configurations which defy traditional cutting-tool methods. It is also of great value in certain machining applications where tool force or pressure must be held to a minimum.

Despite the absence of direct contact between the workpiece and the EDM tool, tool wear is the most significant factor in determining the feasibility of the EDM method. Not only does erosion of the workpiece take place when the spark strikes its surface, but the electrode emitting the spark is also subject to attack. For some electrode materials it has been found that electrode wear exceeds workpiece erosion, hence such electrodes are impractical. In order for an EDM electrode to be commercially feasible, the wear ratio must be such that more metal is removed from the workpiece than is extracted from the electrode. The greater this ratio, the more practical the electrode.

The reasons for EDM electrode wear are highly complex, but it has been postulated that as the spark leaps from the electrode to the workpiece, a field is created in which thermal heat and ions flow to attack the electrode structure. Consequently, the higher the melting point of the electrode material, the less it is susceptible to attack.

However, the melting point is not the only factor which must be taken into account in the choice of electrode material. The eroded area of the workpiece assumes a shape which complements that of the electrode. Therefore, as the electrode must be machined to a desired configuration, the machinability of the electrode material is a vital commercial factor. It is for this reason that carbon, which has a high melting temperature nevertheless leaves much to be desired as an EDM material, for carbon is brittle, it is subject to thermal and mechanical shock, and cannot readily be machined to a desired shape.

Accordingly, it is the principal object of this invention to provide an EDM electrode which has superior characteristics both with respect to wear ratio and machinability. A salient advantage of the invention resides in the fact that the electrode may be inexpensively machined to close tolerances.

More specifically, it is an object of the invention to provide an EDM electrode constituted by a porous sintered skeleton formed of a refractory metal such as tungsten, the pores of which are impregnated with an inorganic compound.

Also an object of the invention is to provide an EDM electrode which is efficient and reliable in operation and which may be mass-produced at low cost.

Briefly stated, these objects are accomplished by first cold-compacting into bar shape, particulates of a refractory metal chosen from the class of tungsten, molybdenum, tantalum and columbium. The cold compact is then sintered in a high-temperature range to provide a rigid, porous skeleton. This skeleton is then impregnated with a molten inorganic compound to fill all voids therein, and the resultant body is machined to the desired shape.

Superior wear ratios have been obtained if the inorganic compound infiltrant contains an element with a different ionization potential, preferably lower than the refractory metal. It has been found that best results are obtained with oxidic combinations: barium tungstate ($BaO:WO_3$); barium aluminate ($BaO:Al_2O_3$); strontium tungstate ($S_rO:WO_4$); calcium aluminate ($CaO:Al_2O_3$), and combinations of barium, calcium aluminate ($BaO:CaO$; $Al_2O_3$) where the mole ratios of $BaO:CaO$; $Al_2O_3$ can change over wide limits from 1/1/1,4/1/1, to 1/4/1.

All these infiltrants give about the same wear ratios. The most practical one to use is barium tungstate, for it can be bought commercially The next most practical is barium, calcium aluminate. The above-named infiltrants melt at 1650° C. Other useful inorganic infiltrants are set forth hereinafter.

For a better understanding of the invention, as well as other objects and features thereof, reference is made to the following detailed specification to be read in conjunction with the drawing showing a flow chart of a process for making an EDM electrode in accordance with the invention.

General disclosure

As indicated previously, a new family of EDM electrodes may be made by combining a refractory metal selected from the class of tungsten, molybdenum, tantalum and columbium, with specific inorganic compounds.

The selected refractory metal in particulate form is processed by powder metallurgical techniques, the first step being to cold-compact the particulates into green bar shape, the green bar thereafter being sintered. Sintering of both tungsten and molybdenum is carried out in a reducing atmosphere such as hydrogen or cracked ammonia, or in a protective atmosphere employing an inert gas such as nitrogen. Other suitable atmospheres may be used with other refractory metals. The sintering temperature range is between 1400° C. and 2700° C., and is preferably in the neighborhood of 2000° C. Below 1400° C., little or no sintering takes place and effective interparticulate bonding does not occur. It is to be noted that even though the inorganic impregnant melts around 1650° C., the sintering may still be carried out below this temperature. However, if the sintering temperature is 1400° C., then some further shrinkage is encountered when the porous bar is impregnated at the higher temperature. But since the impregnated bar is later machined to dimension, the shrinkage is of no consequence.

It is essential that the sintering temperature be high enough so that the fine refractory particulates join each other to form a very rigid porous structure. Under these conditions, the sintering temperature of the compact is always much higher than the melting point of the inorganic compounds thereafter used to impregnate the pores. The strength and final sintering density of the bar is a function of the compaction pressure applied to the particulates. In practice, a range of about 10,000 to 30,000 p.s.i. is suitable to produce the desired porous structures. Thus tungsten bars pressed at 16,000 and 20,000 p.s.i. exhibited only about a 1% difference in theoretical density when sintered under exactly the same conditions.

The method set forth below will describe the formation of a porous tungsten structure impregnated with barium tungstate. It is to be understood, however, that apart from the use of appropriate sintering atmospheres, the method is essentially the same for other combinations falling within the scope of the invention.

*Example of method*

*Step I.*—Tungsten powders having a mean particle size of 4.5 microns are pressed in a suitable die into bars, using a pressure of 20,000 p.s.i. Such green bars, even without the use of a binder, have sufficient coherence and strength to be handled, and they can be readily shaped by hand tools.

*Step II.*—The green tungsten bars are then loaded into a high-temperature sintering furnace where the temperature is slowly raised to about 2360° C., and maintained at this level for about 20 minutes. It has been found that for 4.5 micron commercial tungsten powders pressed at 20,000 p.s.i. and sintered at 2360° C. for 20 minutes, the resultant structure has a density of 84% of theoretical. It will be appreciated that by proper adjustment of time and sintering temperature parameters, other values of theoretical density may be obtained.

*Step III.*—For purposes of quality control, the porous tungsten bars formed in Step II are weighed first in air and then weighed again when submerged in mercury. From these two values the percentage of theoretical density can be computed. If the percentage falls below the desired amount, the bars can be resintered until the requisite value is attained. To insure uniform skeletons, the theoretical density should be held to within plus and minus 2%.

*Step IV.*—The porous sintered tungsten bars are then loaded into a high-temperature impregnation furnace having a hydrogen atmosphere. An amount of barium tungstate sufficient to effect complete impregnation is placed around and in contact with the bars. The furnace temperature is then slowly elevated until the barium tungstate becomes molten and starts to wet the porous tungsten skeletons. At this point, the temperature is 1650° C., the melting point of barium tungstate, which is still well below the sintering temperature of the tungsten. This temperature level is held for about 10 minutes, and as a result, all pores of the tungsten skeleton are filled with the molten barium tungstate. The furnace temperature is then quickly reduced to room temperature.

*Step V.*—Finally, the tungsten bars impregnated with barium tungstate are machined to the required EDM specifications to produce electrodes which are ready for service and which have optimum wear ratio characteristics. I have found that EDM electrodes, using infiltrants of inorganic compounds not only provide wear ratios which are even better than those obtained with the invention disclosed in my above-identified pending application, but they are also machinable.

*Other examples*

Basically the same technique is useable in making other refractory metal porous bars infiltrated with an inorganic compound, except that the sintering temperature and sintering atmosphere may have to be changed. The melting points of tungsten, tantalum, molybdenum, and columbium are as follows: 3370° C., 3027° C., 2620° C., and 1950° C. Thus, the sintering temperatures must be reduced roughly in accordance with the melting points. In on event does the sintering temperature go below 1400 C. For the elements discussed, one will find that there is some additional shrinkage when the porous bar is sintered at 1400° C. and then impregnated at 1650° C. The amount of shrinkage at a given temperature increases in the order tungsten, tantalum, molybdenum, and columbium; however, practically this is of no consequence since the bars are machined to specifications. Tantalum and columbium must be sintered and impregnated in vacuo or an inert atmosphere, for these metals form hydrides in the presence of hydrogen. In all other respects the process is the same.

For EDM electrodes the density of the porous refractory metal bars can be varied over rather wide limits by using either a lower or higher compacting pressure, a coarser or finer refractory metal powder, a lower or higher sintering temperature (provided it does not fall below 1400° C.), and either a shorter or longer sintering time. A practical density range for the porous refractory bar is between 50–88 percent of theoretical. Above 88% of theoretical density, the number of non-interconnecting pores increases very rapidly and impregnation with the inorganic compound is rendered difficult. Below 50% of theoretical density the mechanical strength of the porous refractory bar is poor.

In addition to barium tungstate ($BaO:WO_3$), twenty other inorganic compounds have been found to give improved wear ratios when rigid porous refractory bars of tungsten, molybdenum, tantalum and columbium were impregnated with them in accordance with the invention. These inorganic compounds, or mixtures thereof are:

(1) Strontium aluminate ($SrO:Al_2O_3$)
(2) Strontium, calcium aluminate ($SrO:CaO:Al_2O_3$
(3) Barium silicate ($BaO:SiO_2$)
(4) Barium, calcium silicate ($BaO:CaO:SiO_2$)
(5) Barium berylliate ($BaO:BeO$)
(6) Barium, calcium berylliate ($BaO:CaO:BeO$)
(7) Barium borate ($BaO:B_2O_3$)
(8) Barium calcium borate ($BaO:CaO:B_2O_3$)
(9) Barium, silicon aluminate ($BaO:SiO_2:Al_2O_3$)
(10) Barium, calcium titanate ($BaO:CaO:TiO_2$)
(11) Magnesium ferrite ($MgO:Fe_2O_3$)
(12) Barium titanate ($BaO:TiO_2$)
(13) Barium, calcium titanate ($BaO:CaO:TiO_2$)
(14) Calcium silicate ($CaO:SiO_2$)
(15) Calcium titanate ($CaO:TiO_2$)
(16) Calcium orthophosphate ($3CaO:P_2O_5$)
(17) Barium zirconate ($BaO:ZrO_2$)
(18) Calcium zirconate ($CaO:ZrO_2$)
(19) Magnesium zirconate ($MgO:ZrO_2$)
(20) Magnesium pyrophosphate ($2MgO:P_2O_5$)

The terms barium-aluminate ($BaO:Al_2O_3$) and or strontium aluminate ($SrO:Al_2O_3$), etc. are considered family names of these oxide mixtures. For example, barium aluminate in this patent application would include mixtures of $3BaO:1Al_2O_3$; $1BaO:1Al_2O_3$; $1BaO:6Al_2O_3$, etc. The same relationship holds true for the remaining compounds including barium tungstate, which has a chemical formula $BaWO_3$, however $2BaO:1WO_3$, $4BaO:1WO_3$ does exist at the melting point of such mole ratios. Furthermore such combinations will impregnate porous tungsten.

*Test results*

A comparative study of EDM electrodes made in accordance with this invention, the invention as disclosed in my copending application Ser. No. 376,074, and a commercially available electrode, has yielded the following results when using the following EDM equipment and workpiece sample.

Machine: Commercial Elox Machine

Cutting capacity of the machine set at the maximum rate—approximately 15 amperes.

Samples: (1) G.E. Tungsten Carbide, Grade 883
(2) Pure molybdenum.

*Results*

| Electrode | G.E. 883 Carbide | | |
|---|---|---|---|
| | Milligrams lost by Electrode cutting sample | Milligrams cut from sample | Wear ratio |
| (1) Brass | 7,010 | 2,100 | 0.30 |
| (2) Mallory 10W3 | 610 | 2,120 | 3.45 |
| (3) 84WZ4.5 | 510 | 2,080 | 4.00 |
| (4) 75MZ4.5 | 374 | 2,050 | 5.50 |
| (5) R100 | 117 | 1,990 | 17.10 |
| (6) R200 | 127 | 2,115 | 16.6 |
| (7) R300 | 124 | 2,120 | 17.0 |
| (8) R400 | 121 | 2,105 | 17.4 |

The G.E. 883 carbide blanks were purchased commercially. They were ⅜" x ¾" x ⅛". The time necessary to cut through such blanks varied from 15 minutes for brass to 4–5 minutes for the remaining electrodes.

| Electrode | Pure Molybdenum | | |
|---|---|---|---|
| | Milligrams lost by Electrode cutting sample | Milligrams cut from sample | Wear ratio |
| (1) Brass | 510 | 502 | 1.00 |
| (2) Mallory 10W3 | 160 | 955 | 6.00 |
| (3) 84WZ4.5 | 264 | 2,845 | 10.80 |
| (4) 75MZ4.5 | 320 | 2,400 | 7.50 |
| (5) R100 | 136 | 2,250 | 16.50 |
| (6) R200 | 148 | 2,100 | 14.20 |
| (7) R300 | 145 | 2,200 | 15.2 |
| (8) R400 | 140 | 2,240 | 16.0 |

The time for all samples was ten minutes. The machine was set in all cases for maximum cutting capacity.

*Notes on electrodes:*

(1) Brass electrode used for these tests was ordinary yellow brass most commonly used by EDM operators.

(2) Mallory 10W3 is a tungsten-copper composite commonly used by many EDM operators. It is made by mixing tungsten and copper powders together, pressing the mixture into a bar, and then sintering the bar in hydrogen at a temperature of about 100° C. above the melting point of copper. Essentially it is a bar of porous tungsten powder held together by copper.

(3) 84WZ4.5 electrode consisted of an 84% porous tungsten body made from 4.5 micron powder, pressed at 20,000 p.s.i., sintered at 2360° C. for a sintering time of 20 minutes, and then impregnated with an alloy of 65% copper by weight, balance zinc, in accordance with the invention.

(4) 75MZ4.5 electrode consisted of a 75% porous molybdenum body made from 4.5 micron powder, pressed at 20,000 p.s.i., sintered at 1650° C. for 15 minutes, and then impregnated with an alloy of 65% copper by weight, balance zinc, in accordance with the invention.

(5) R100 electrode consisted of an 80% porous tungsten body made from 4.5 micron powder, pressed at 20,- 000 p.s.i, sintered at 2250° C. for a sintering time of 20 minutes and then impregnated with molten barium tungstate ($BaO:WO_3$), in accordance with the invention.

(6) R200 is the same item as Item 5, except that the porous tungsten bar was impregnated with barium aluminate having the mole ratio of $2BaO;1Al_2O_3$.

(7) R300 is the same as Item 5, except that the porous tungsten bar was impregnated with strontium tungstate ($SrO:WO_3$).

(8) R400 is the same as Item 5, except that the porous tungsten bar was impregnated with barium, calcium aluminate with a mole ratio of $2BaO:1CaO; 1Al_2O_3$.

While I have shown preferred embodiments of electrical discharge machine electrodes in accordance with the invention, it will be appreciated that many changes and modifications may be made therein without, however, departing from the essential spirit of the invention as defined in the annexed claims.

What I claim is:

1. The method of fabricating an EDM electrode, comprising the steps of compacting tungsten particulates, sintering said compact to produce a porous rigid blank, impregnating said blank with a molten barium tungstate, and machining the impregnated blank to the desired electrode shape.

2. An electrical discharge machining electrode comprising a porous skeleton shaped to the desired electrode configuration and formed of a sintered refractory metal selected from the class consisting of tungsten, molybdenum, tantalum and columbium, and an inorganic compound filling the pores of said skeleton, wherein said inorganic compound is barium tungstate.

3. An electrical discharge machining electrode comprising a porous skeleton shaped to the desired electrode configuration and formed of a sintered refractory metal selected from the class consisting of tungsten, molybdenum, tantalum and columbium, and an inorganic compound filling the pores of said skeleton, wherein said inorganic compound is strontium tungstate.

4. An electrical discharge machining electrode comprising a porous skeleton shaped to the desired electrode configuration and formed of a sintered refractory metal selected from the class consisting of tungsten, molybdenum, tantalum and columbium, and an inorganic compound filling the pores of said skeleton, wherein said inorganic compound is calcium tungstate.

5. An electrical discharge machining electrode comprising a porous skeleton shaped to the desired electrode configuration and formed of a sintered refractory metal selected from the class consisting of tungsten, molybdenum, tantalum and columbium, and an inorganic compound filling the pores of said skeleton, wherein said inorganic compound is barium aluminate in combination with calcium aluminate.

References Cited

UNITED STATES PATENTS

| 2,640,135 | 5/1953 | Cobine | 219—145 |
| 3,035,151 | 5/1962 | Weglarz | 219—69 |
| 3,244,852 | 4/1966 | Herterick et al. | 219—69 |

RICHARD M. WOOD, *Primary Examiner.*

R. F. STAUBLY, *Assistant Examiner.*